July 25, 1944.　　　A. G. SUELFLOW　　　2,354,410
VEGETABLE BUNCH TYING MACHINE
Filed June 21, 1943　　　4 Sheets-Sheet 1

INVENTOR
ALFRED G. SUELFLOW

BY

ATTORNEYS

July 25, 1944.  A. G. SUELFLOW  2,354,410
VEGETABLE BUNCH TYING MACHINE
Filed June 21, 1943  4 Sheets-Sheet 2
Fig. 2.
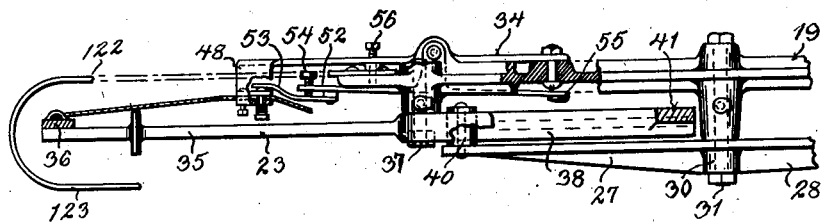
Fig. 3.
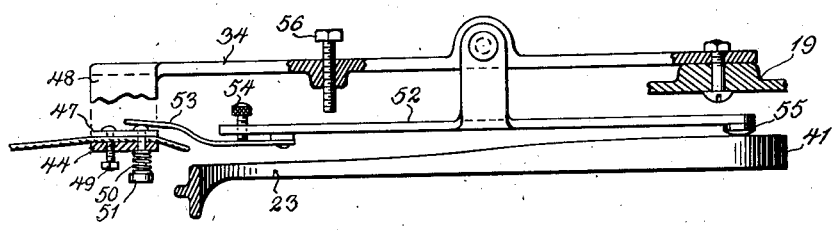
Fig. 6.
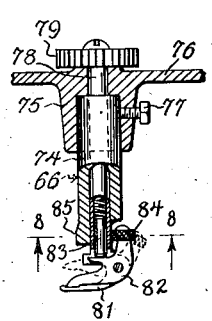
Fig. 7.  Fig. 8.
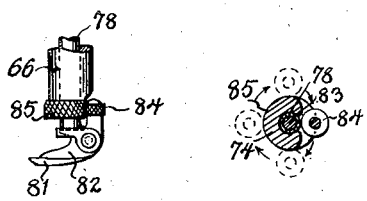
INVENTOR
ALFRED G. SUELFLOW
BY 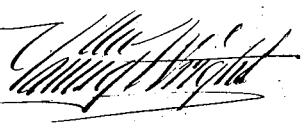
ATTORNEYS July 25, 1944.   A. G. SUELFLOW   2,354,410
VEGETABLE BUNCH TYING MACHINE
Filed June 21, 1943   4 Sheets-Sheet 3
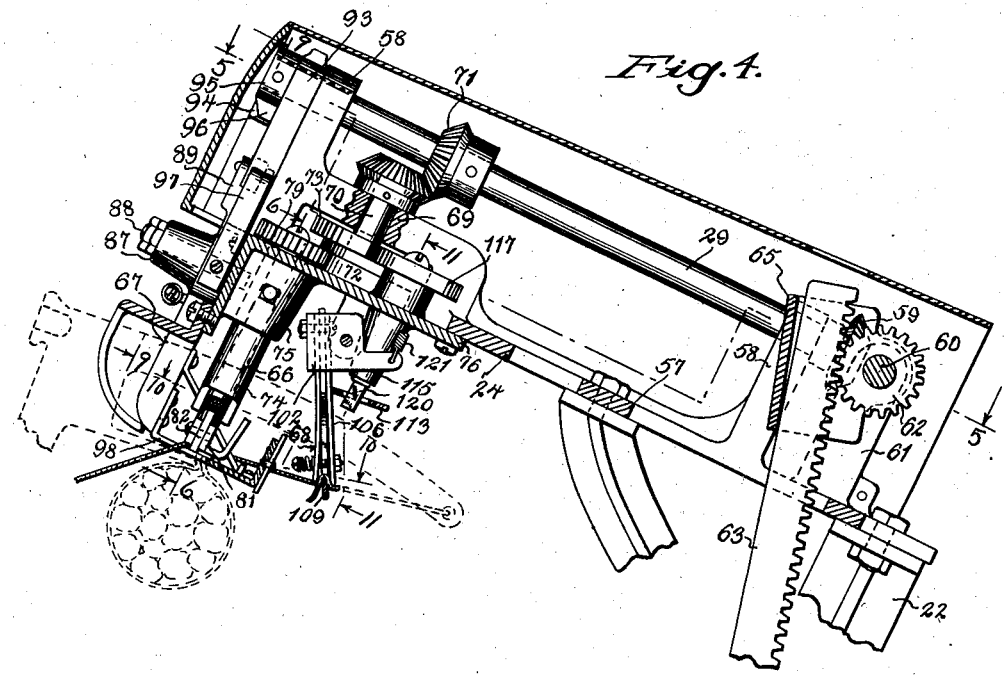
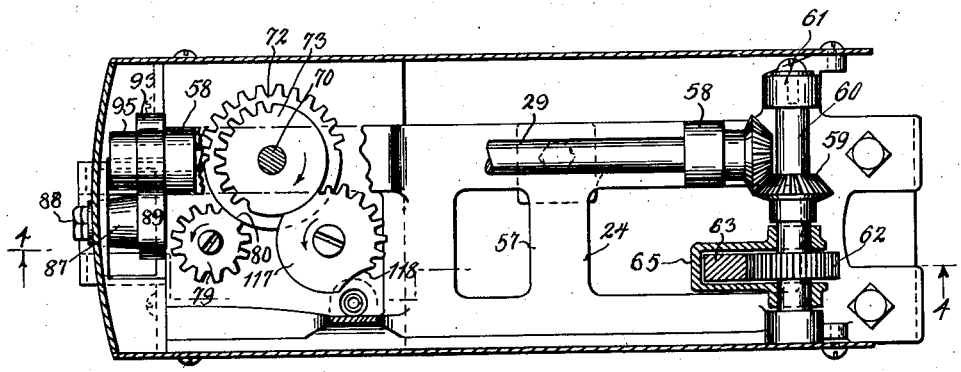
INVENTOR
ALFRED G. SUELFLOW
BY
ATTORNEYS July 25, 1944.  A. G. SUELFLOW  2,354,410
VEGETABLE BUNCH TYING MACHINE
Filed June 21, 1943   4 Sheets-Sheet 4

INVENTOR
ALFRED G. SUELFLOW
BY
ATTORNEYS

Patented July 25, 1944

2,354,410

UNITED STATES PATENT OFFICE 2,354,410

VEGETABLE BUNCH TYING MACHINE

Alfred G. Suelflow, Milwaukee, Wis.

Application June 21, 1943, Serial No. 491,586

8 Claims. (Cl. 100—31)

This invention appertains to vegetable bunch tying machines and is an improvement over the structure shown in Patent #1,407,481, issued to Frank Radechovsky February 21, 1922.

One of the primary objects of my present invention is to generally improve the structure shown in said patent, whereby to produce a vegetable bunch tyer which will be exceptionally efficient in operation, one which will operate with a minimum amount of effort and one in which bunches of vegetables of all sizes can be accurately and rapidly tied.

Another salient object of my invention is to provide a simple and direct means for operating the needle bar from the foot lever, whereby to reduce the number of operating parts and to produce a smooth efficient structure.

A further important object of my invention is to provide a novel and efficient means for operating the main drive shaft for the knotter, the stripper and string cutter, the shuttle or end string holder, etc., from the foot lever, whereby not only will the shaft be actuated in proper timed relation with the needle, but whereby a trouble free mechanism will be had.

A still further object of my invention is to produce a simple mechanism for operating the knotter, the stripper and string cutter, and shuttle or string holder from the drive shaft, so that all of said parts will operate in a smooth proper timed relation relative to one another.

A still further important object of my invention is to provide novel means for automatically increasing and decreasing the tension on the string during the operation of the needle bar, whereby to prevent the tangling of the string as the same is pulled off of the cone or ball.

With these and other objects in view, the invention consists in the novel construction, arrangement, and formation of parts, as will be hereinafter more specifically described, claimed, and illustrated in the accompanying drawings, in which drawings:

Figure 2 is an enlarged, fragmentary, sectional view taken on the line 2—2 of Figure 1 looking in the direction of the arrows, illustrating the mechanism for operating the needle bar and the string tension mechanism.

Figure 3 is a fragmentary, sectional view taken on a larger scale than Figure 2 and on the line 3—3 of Figure 1 looking in the direction of the arrows.

Figure 4 is an enlarged, fragmentary, longitudinal, sectional view through the head of the machine taken on the line 4—4 of Figure 5 looking in the direction of the arrows, and illustrating the operating means for the main drive shaft and the means for actuating the knotter, stripper and string cutter and string holder and shuttle from the drive shaft.

Figure 5 is a section through the head of the machine taken at right angles to Figure 4 and substantially on the line 5—5 of Figure 4.

Figure 6 is a detail, sectional view taken on the line 6—6 of Figure 4 looking in the direction of the arrows, illustrating the knotter.

Figure 7 is a fragmentary, side elevational view of the lower end of the knotter.

Figure 8 is a horizontal, sectional view through the knotter taken on the line 8—8 of Figure 6.

Figure 1:
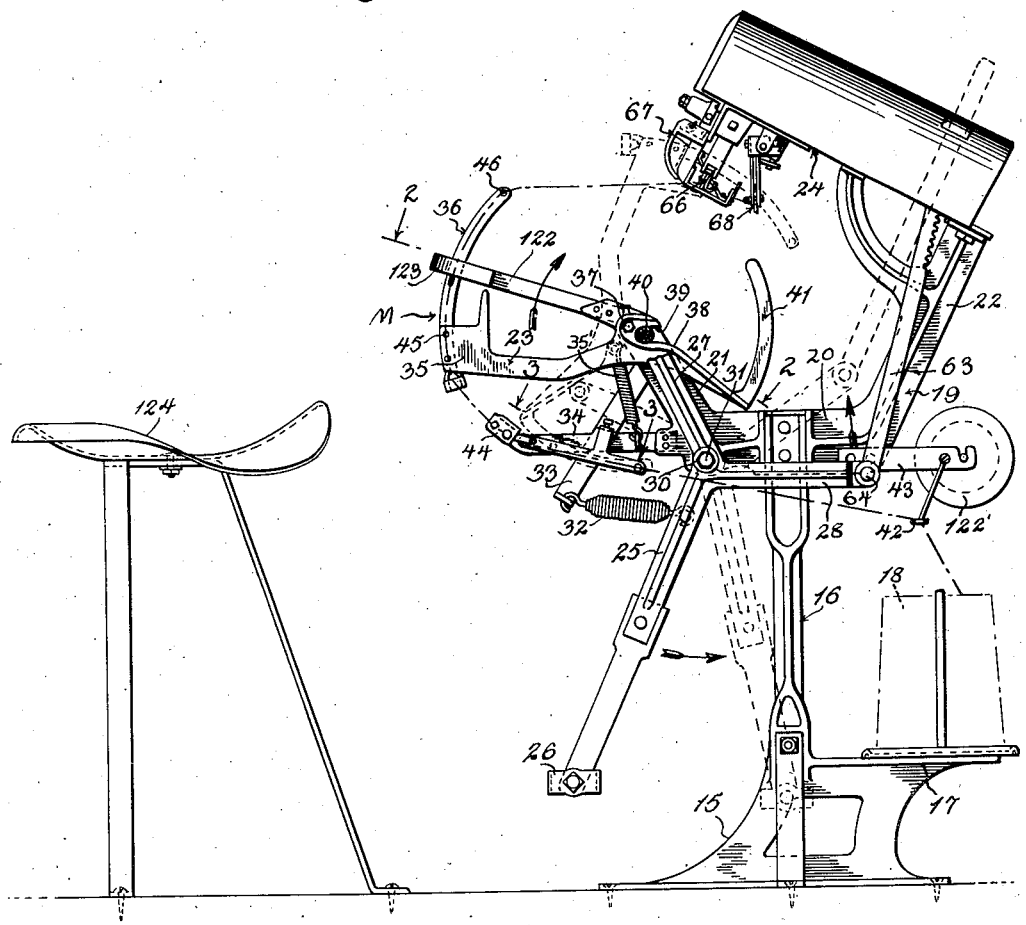
Figure 1 is a side, elevational view of my improved bunch tying machine.

Referring to the drawings in detail, wherein similar reference characters designate corresponding parts throughout the several views, the letter M generally indicates my improved vegetable bunch tying machine and the same includes a base 15 having formed thereon an upright pedestal or column 16. The base and column can be braced in any preferred manner and the base has formed thereon a bracket 17 on which is supported, in any desired way, the cone of twine 18.

Rigidly bolted or otherwise affixed to the column is the main frame casting 19. This casting includes a main body portion 20 which is secured to the column or pedestal and diverging upwardly extending front and rear supporting arms 21 and 22. The front arm 21 carries the needle mechanism 23 and the rear arm 22 and its associate parts carry the head 24 of the machine.

Rockably mounted upon the body portion 20 of the frame casting 19 is the foot lever 25 and this foot lever depends from said casting in front of the column or standard 16. The lower end of the foot lever 25 carries the foot pedal 26 for the operator. The lever 25 has formed on its upper end angularly extending operating arms 27 and 28. The arm 27 is employed for actuating the needle mechanism 23, as will be later described, and the arm 28 is employed for operating the main shaft 29 which forms a part of the head 24. A bearing 30 is carried by the upper end of the foot lever 25 substantially at the juncture of the arms 27 and 28 therewith and this bearing receives a stud 31 carried by the main frame 19. This bearing may include (and preferably does) roller or ball bearing races. The lever 25 is normally held forward in a non-operative position by means of a contractile coil spring 32 which is connected to said lever and to a brace bar 33 attached to the casting 19. A similar forwardly extending brace arm 34 is connected to the front of the casting and forms a guide for the string, as will also hereinafter more fully appear.

Referring to the needle mechanism 23, the same includes a needle bar or lever 35 and the forward end of this needle bar or lever carries the arcuate cord carrying needle 36. The needle bar or lever 35 is rockably mounted, as at 37, on the upper end of the arm 21 of the frame 19 and this bearing can also be of roller or ball type. Formed on the needle bar directly in rear of the bearing for the bar is the push arm 38 and this push arm terminates in an arcuate seat 39 which normally receives the operating pin 40. This operating pin is carried by and extends laterally from the front arm 27 of the foot lever and a suitable rolling anti-friction sleeve is carried by said pin for engaging the track formed on the push arm 38. The rear end of the push arm 38 has formed thereon the upwardly extending arcuate guide and cam leg 41. A contractile coil spring 35' has its opposite ends connected respectively to the needle bar 35 and to the brace arm 34 of the frame casting 19 and normally holds the needle bar 35 in its lowered position.

From the description so far, it can be seen that when the pedal 26 is pushed rearwardly to the dotted line position shown in Figure 1, the pin 40 will be brought forward and downward and the same will ride on the track of the push arm 38 of the needle bar 35 and consequently, the needle bar will be rocked moving the needle 36 under the head 24.

The cord or twine is brought up from the cone 18 through a guide eye 42 carried by a bracket 43 which is supported from the frame 19. This guide eye is arranged directly above the cord or twine cone and from the eye the cord is brought forwardly through a spring tension device 44 carried by the brace arm 34. This spring tension device 44 forms an important feature of the invention and will be later described. From the spring tension device the cord is threaded through intermediate guide openings or eyes 45 formed in the needle and the extreme upper end of the needle 36 has formed therein a guide eye 46, and the cord after being fed through this eye is brought under the head 24 and held by certain other mechanisms as will be described.

Referring now to the cord spring tension device 44 (see Figures 2 and 3) it can be seen that the same includes a tension plate 47 carried by a part of a U-shaped ear 48 formed on the bracket or brace bar 34. The cord extends between this part of the U-shaped ear and the tension plate and the plate is loosely fastened to said ear by a bolt 49. The plate is normally drawn toward the cord or twine by a light tension spring 50 which is carried by the tension plate 47 and this bolt slidably extends through the ear 48 and the tension spring 50 is confined between said ear and a head 51 carried by the bolt. Thus normally a light tension or drag is placed on the cord below the needle and this tension is increased after a bunch of vegetables has been fed to the machine and when the needle is actuated during the tying of the knot. In order to increase the tension, a rock arm 52 is carried by the bracket or brace bar 34 and this rock arm is mounted for swinging movement intermediate its ends on said bracket 34. The forward end of the rock arm 52 carries a leaf spring 53 which is adapted to engage, at certain times, the tension bolt and the position of the spring can be adjusted by a thumb screw 54. The rear end of the rock arm 52 carries a button 55 which is arranged in the path of the cam and guide arm 41 formed on the needle bar 23. As the needle 36 is actuated, the cam and guide arm 41 sweeps past the rock arm 52 and engages the button 55, and presses on said button swinging the leaf spring 53 into tight contact with the tension bolt which moves the tension plate 47 into further gripping contact with the twine or cord. Swinging movement of the rock arm 52 can be controlled by the thumb screw 56 which is carried by the bracket 34.

The head 24 includes a frame or base plate 57 which is rigidly bolted to the rear arm 22 and its associate parts of the main frame casting 19. This base plate 57 has formed thereon bearings 58 for rotatably supporting the main drive shaft 29. This shaft is connected through the medium of intermeshing beveled gears 59 with a cross shaft 60 and this shaft 60 is also rotatably mounted in suitable bearings 61 carried by the base plate 57. The bearings can be of any preferred type and can be provided with ball or roller bearing anti-friction members. Keyed or otherwise affixed to the cross shaft 60 is a pinion 62 and this pinion is engaged by a rack bar 63. The rack bar extends downwardly from the head 24 and is pivotally connected at its lower end, as at 64, to the rearwardly extending arm 28 formed on the foot lever 25. Consequently, upon movement of the foot lever rearwardly, the rack bar 63 is raised causing the rotation of the shafts 60 and 29. In order to hold the rack bar 63 into engagement with the pinion 62, the shaft 60 has loosely mounted thereon a U-shaped guide bracket 65 which extends about the rack bar and the rack bar slides through said guide. As brought out in the objects of the invention, the shaft 29 operates the knotter 66, the string or cord stripper and cutter 67 and the shuttle or cord end holder 68. The frame plate 57 also carries a bearing 69 for a stub shaft 70. This shaft 70 is rotated from the main drive shaft 29 through the use of meshing beveled pinions 71. Keyed or otherwise secured to the lower end of the shaft 70 is a pair of sector gears 72 and 73. These gears 72 and 73 have teeth formed thereon for only a part of their circumference and the bottom gear 72 is of a slightly greater size than the top gear 73 and is employed for turning the knotter 66. The gear 73 is employed for operating the shuttle or string holder 68.

The knotter 66, the stripper and knife cutter 67 and the string holder or shuttle 68 all cooperate with one another and function in the same manner as shown and described in the Radechovsky patent No. 1,407,481 above mentioned. In conjunction with the operation of these parts, attention is also directed to the patent application of Frank Radeck, Serial No. 409,676, filed September 5, 1941. In view of the showing and description of the operation of these parts in said Radeck application, the operation of these parts will not be described in minute detail but will be sufficiently described to bring about the clear understanding of the new drive therefor.

The knotter 66 (see Figures 6, 7, and 8) includes a depending bearing sleeve 74 detachably fitted in a socket 75 carried by a bracket plate 76 rigidly secured to the base or frame plate 57 of the head 24. The bearing sleeve is held in place in its socket by a set screw 77. Rotatably mounted within the bearing sleeve 74 is the knotter shaft 78 and detachably secured to this shaft is a mutilated pinion 79 which is adapted to engage the sector gear 72. This pinion 79, for a small portion of its periphery, is provided with an arcuate bearing face 80 for engaging the smooth portion of the sector gear 72. Carried by the lower end of the knotter shaft 78 is the rigid cord gripping finger or jaw 81 and pivotally mounted upon said rigid jaw is the movable cord gripping finger or jaw 82. The movable jaw is normally held down into engagement with the rigid jaw by a spring pressed plunger 83. This movable jaw or finger 82 carries a roller 84 which is adapted to engage the cam track 85 on the lower end of the bearing sleeve 74 so that upon rotation of the shaft 78, the movable jaw or finger 82 will be opened and closed at the proper times.

The cord stripper and cutter includes a rock arm 86. This arm carries a bearing 87 and the bearing is mounted upon a stub shaft 88 carried by the frame bracket 76 and this rock arm is so mounted as to swing back and forth transversely of the head and under the knotter 66. The upper end of the rock arm 86 has formed thereon above the stub shaft an arcuate operating lever 89 and this lever carries at its upper end an anti-friction roller 90 and a latch keeper notch 91.

Figure 9:
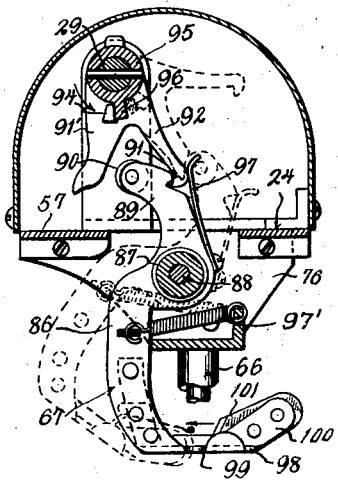
Figure 9 is a transverse, sectional view through the head of the machine taken on the line 9—9 of Figure 4 looking in the direction of the arrows, illustrating the mechanism employed for actuating the stripper and string cutter from the main operating shaft.
Figure 10:
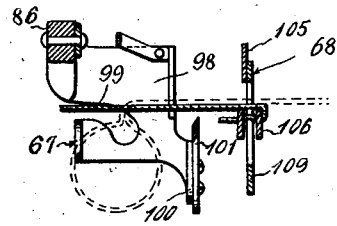
Figure 10 is a detail, sectional view taken at right angles to Figure 9 and substantially on the line 10—10 of Figure 4 looking in the direction of the arrows, illustrating parts of the stripper and string cutter and string holder or shuttle.
Figure 11:
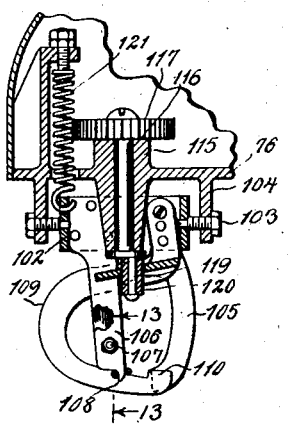
Figure 11 is a fragmentary, transverse, sectional view taken on the line 11—11 of Figure 4 looking in the direction of the arrows, illustrating the mechanism for actuating the string holder or shuttle.
Figure 12:
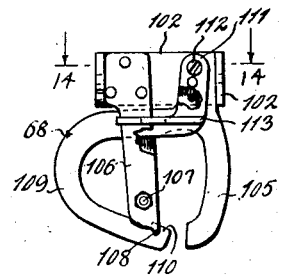
Figure 12 is a front, elevational view of the string holder or shuttle per se, showing the shuttle arm in its open position.
Figure 13:
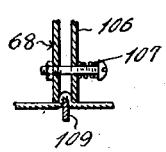
Figure 13 is a detail, sectional view through the string holder or shuttle taken on the line 13—13 of Figure 11 looking in the direction of the arrows.
Figure 14:
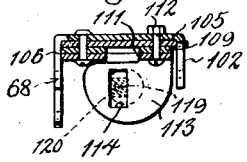
Figure 14 is a horizontal, sectional view through the string holder or shuttle taken on the line 14—14 of Figure 12.

In order to bring about the operation of the stripper and string cutter, the main operating shaft 29 has loosely mounted thereon a trip leg 91' and hooked latch 92. The trip leg 91' and the latch 92 are formed on a hub 93 and this hub is provided with a forwardly extending lug 94. Keyed or otherwise secured to the shaft 29 is a trip collar 95 and this trip collar has formed thereon the radially extending trip lug 96 which is adapted to engage the lug 94, at certain times. Normally the trip leg 91' is in front of the anti-friction roller 90 and the trip arm 89, and the latch arm 92 normally seats in the keeper notch 91. A leaf spring 97 is carried by the arm 89 for normally holding said latch 92 in the keeper notch. A coil spring 97' has its opposite ends connected respectively to the rock arm 86 and the frame bracket 76 and functions to normally hold the rock arm in its lowered position as shown in Figure 9.

The rock arm 86 has riveted or otherwise secured thereto a laterally extending plate 98 and this plate has formed therein a cord receiving notch 99 which facilitates the stripping or pulling of the knot from off of the knotter 66. The inner edge of the plate 98 is provided with an upstanding flange 100 and secured to this flange is the cord or string cutter knife 101.

During rotation of the shaft 29, the latch arm 92 will be first moved from out of the keeper notch 91, after which the trip leg 91' will engage the anti-friction roller 90 and rock the rock arm 86 to the left (see Figure 9) under the knotter and as the cord is in the stripper slot 99, such cord will be pulled away from the knotter and the knife 101 will cut that part of the string between the knotter and the string holder or shuttle 68. During the initial rotation of the shaft 29 no movement will be imparted to the stripper and cutter and at this time the knotter will be performing its work, but as soon as the shaft 29 completes substantially one revolution in a counter-clockwise direction (see Figure 9) the lug 96 on the collar will engage the lug 94 on the trip leg 91' causing the desired movement of such leg.

The string holder or shuttle is mounted in rear of the knotter 66 and the cord and string stripper or cutter 67 and the same includes (see Figures 11 to 14 inclusive) a substantially U-shaped hanger bracket 102. This hanger bracket is provided with bearing openings which receive adjustable pintles 103 carried by depending ribs 104 formed on the bracket plate 76. Hence the hanger bracket 102 is mounted for swinging movement and has riveted or otherwise secured thereto a stationary guide finger 105. The bracket has also riveted or otherwise secured thereto a pair of depending slightly spaced stationary cord receiving fingers 106 and the lower ends of these fingers are normally urged toward one another by a spring tension bolt 107. The extreme lower ends of these pairs of fingers 106 have formed thereon depending cord engaging ears 108. By referring to Figures 11 to 14, inclusive, it can be seen that the pair of cord gripping fingers 106 are spaced from the stationary guide finger 105. Movable between the pair of stationary cord gripping fingers 106 is a swinging cord retaining finger 109. This cord retaining finger 109 is of a C shape and the extreme lower outer end thereof has formed thereon a cord engaging hook 110. The upper end of the movable finger 109 has formed thereon an upwardly extending hanger arm 111 which is mounted for swinging movement on a pivot bolt 112 carried by the hanger bracket 102. A cam plate 113 is carried by and extends laterally from the movable finger and is provided with a cam receiving slot 114.

Rotatably mounted in a bearing 115 carried by the bracket plate 76 is the shaft 116 for operating the movable finger 109. This shaft has secured thereto a mutilated pinion 117, the teeth of which are adapted to mesh with, at certain times, the teeth of the gear 73 on the stub shaft 70. This pinion 117 has formed thereon arcuate smooth bearing faces 118 for engaging, at certain times, the smooth portion of the sector gear 73. Carried by the lower end of the shaft 116 is an eccentric pin 119. This pin is mounted in the slot 114 and can be provided with a square shaped sleeve 120. Hence, during the rotation of the shaft 116, the eccentric pin 119 will function to swing the pivoted retaining finger 109 back and forth between the stationary cord gripping fingers 106 and toward and away from the stationary guide finger 105. A tension spring 121 is connected to the hanger bracket 102 and normally tends to move the hanger bracket 102 and the finger carried thereby away from the knotter 66. However, during the rotation of the knot, a pull will be exerted on the cord or string held by the string holder or shuttle and consequently the string holder or shuttle can be swung by this string pull toward the knotter against the tension of the spring 121.

The machine operates as follows, it being understood that the string is threaded off of the cone through the needle, in the manner described, under the knotter jaws to the string holder or shuttle 68; a bunch of vegetables is taken and brought against the string directly under the knotter 66 and the stripper and string cutter 67 so that the string will partially encircle the bunch of vegetables. The foot lever 25 is now pushed rearwardly bringing the needle up past the knotter 66, the stripper and cord cutter 67 and the string holder 68 which will bring the cord tightly about the bunch of vegetables. The shaft 29 will now be operated and the knotter will function to tie the knot. As the knot is being tied and the knotter makes a complete revolution, the stripper and cutter will be shifted laterally and will pull the knot from the knotter fingers or jaws and at the same time sever the cord between the holder 68 and the knotter. As the needle is moving past the string holder 68, the movable or shuttle finger 109 by means of its hook 110 will engage the string carried by the needle and shift the string under the nose or lugs 108 on the pair of stationary fingers 106.

As the foot lever returns to its normal position, the shaft 29 will be rotated reversely and all parts will be returned to their normal position ready to tie another bunch of vegetables.

Initially, as the bunch of vegetables are placed in position, the string will move or freely slide through the needle and between the tension plate 47 and its support but upon the movement of the needle and when the cam and guide arm 41 thereof strikes the button 55 the tension on the cord will be naturally increased so that free pull on the cord will be prevented. This prevents undue cord from being pulled off the cone and the tangling thereof and further aids in the tying of a tight knot.

A guide and guard bar 122 is riveted or otherwise fastened to the front forwardly extending arm 21 of the main frame 19. The forward end of this guard and guide bar 122 is bent into a U-shape, as at 123, and the needle rides through this U-shape portion. As shown in Figure 1 a seat 124 can be mounted in front of the machine M for the operator.

If desired, tying tape can be used instead of twine and consequently the bracket arm 43 is constructed to receive a reel of tape 122'.

From the foregoing description, it can be seen that I have generally improved the construction of the bunch tyer illustrated and described in the mentioned Patent #1,407,481 and that a novel and new drive has been provided for insuring the smooth and proper timed operation of all of the parts relative to one another.

Changes in details may be made without departing from the spirit or the scope of my invention, but what I claim as new is:

1. In a machine for tying bunches of vegetables and the like, a support, a head carried by the support including a longitudinally extending, rotatable operating shaft, a knotter, a string stripper and cutter, and a string holder all operatively connected to the forward end of said operating shaft, a needle bar rockably mounted upon the support, a string carrying needle secured to the needle bar movable under the head and the knotter, string stripper and cutter, and string holder carried thereby upon movement of the needle bar, an operating lever rockably mounted upon the support, means for operating the needle bar from the lever and means for operating the shaft from said lever, said last named means including a rack bar pivotally carried by the lever and a pinion operatively connected to said shaft engaged by said rack bar.

2. In a machine for tying bunches of vegetables and the like, a support, a head carried by the support including a longitudinally extending, rotatable operating shaft, a knotter, a string stripper and cutter, and a string holder all operatively connected to the forward end of said operating shaft, a needle bar rockably mounted upon the support, a string carrying needle secured to the needle bar movable under the head and the knotter, string stripper and cutter, and string holder carried thereby upon movement of the needle bar, an operating lever rockably mounted upon the support, means for operating the needle bar from the lever and means for operating the shaft from said lever, said last named means including a cross shaft rotatably carried by the head, intermeshing gears operatively connecting the cross shaft with the operating shaft, a pinion fixed to said cross shaft, and a rack bar pivotally connected to said lever and engaging said pinion.

3. In a machine for tying bunches of vegetables and the like, a support, a head carried by the support including a longitudinally extending, rotatable operating shaft, a knotter, a string stripper and cutter, and a string holder all operatively connected to the forward end of said operating shaft, a needle bar rockably mounted upon the support, a string carrying needle secured to the needle bar movable under the head and the knotter, string stripper and cutter, and string holder carried thereby upon movement of the needle bar, an operating lever rockably mounted upon the support, means for operating the needle bar from the lever and means for operating the shaft from said lever, said last named means including a cross shaft rotatably carried by the head, intermeshing gears operatively connecting the cross shaft with the operating shaft, a pinion fixed to said cross shaft, and a rack bar pivotally connected to said lever and engaging said pinion, and a U-shaped guide for said rack bar rockably mounted upon said cross shaft and receiving the pinion and the rack bar.

4. In a machine for tying bunches of vegetables and the like, a support, a head mounted upon the support including a longitudinally extending, rotatable main operating shaft, a rotatable knotter mechanism carried by the forward end of the head, a laterally swinging string stripper and cutter mounted upon said head in front of the knotter, a string holder rockably mounted upon the head in rear of the knotter including a laterally shiftable swinging finger, means for operating the string stripper and cutter from the main shaft comprising, a stub shaft rotatably carried by the head, means operatively connecting the stub shaft with the main operating shaft, and gear mechanism operatively connecting the stub shaft with the knotter and the swinging finger of the string holder, a needle bar rockably carried by the support, a string carrying needle secured to the bar and movable past the knotter, string stripper and cutter and the string holder upon operation of the needle bar, a swinging operating lever, means operatively connecting the lever with the needle bar, and means operatively connecting the lever with the main operating shaft.

5. In a machine for tying bunches of vegetables and the like, a support, a head carried by the support including a longitudinally extending rotatable shaft, a knotter, a string stripper and cutter and a string holder, means for operating the knotter, string stripper and cutter and string holder from the shaft, a needle bar rockably mounted upon the support, a string carrying needle on the forward end of the needle bar movable under the head and past the knotter, string stripper and cutter, and string holder upon operation of the needle bar, a foot lever rockably mounted at its upper end on the support, diverging arms rigidly carried by the foot lever, means operatively connecting one of said arms to the needle bar and a rack bar pivotally carried by the other of said arms for operating the shaft.

6. In a machine for tying bunches of vegetables and the like, a support, a needle bar rockably mounted upon the support, a string carrying needle secured to the forward end of the bar, a foot lever, means rockably connecting the foot lever with the needle bar, a cam arm on the rear end of said needle bar, a source of string supply, the string being threaded through the needle, and a string tension device carried by the support including a tension plate for engaging the string between the needle and the source of supply, a pivoted arm having one end disposed in the path of the cam arm on the needle bar, whereby upon movement of the bar the forward end of the pivoted arm will be swung into engagement with the tension plate.

7. In a machine for tying bunches of vegetables and the like, a support, a needle bar rockably mounted upon the support, a string carrying needle secured to the forward end of the bar, a foot lever, means rockably connecting the foot lever with the needle bar, a cam arm on the rear end of said needle bar, a source of string supply, the string being threaded through the needle, and a string tension device carried by the support including a tension plate for engaging the string between the needle and the source of supply, a pivoted arm having one end disposed in the path of the cam arm on the needle bar, whereby upon movement of the bar the forward end of the pivoted arm will be swung into engagement with the tension plate, said swinging arm having a tension leaf spring for engaging said tension plate.

8. In a machine for tying bunches of vegetables and the like, a support, a needle bar rockably mounted upon the support, a string carrying needle secured to the forward end of the bar, a foot lever, means rockably connecting the foot lever with the needle bar, a cam arm on the rear end of said needle bar, a source of string supply, the string being threaded through the needle, and a string tension device carried by the support including a tension plate for engaging the string between the needle and the source of supply, a pivoted arm having one end disposed in the path of the cam arm on the needle bar, whereby upon movement of the bar the forward end of the pivoted arm will be swung into engagement with the tension plate, said swinging arm having a tension leaf spring for engaging said tension plate, means for adjusting the ends of said leaf spring, and means for limiting the movement of the swinging arm.

ALFRED G. SUELFLOW.